United States Patent Office 3,052,657
Patented Sept. 4, 1962

3,052,657
SULFUR-CONTAINING POLYMERS AND
LUBRICANTS CONTAINING THEM
George M. Calhoun, Berkeley, and William A. Hewett, Oakland, Calif., assignors to Shell Oil Company, New York, N.Y., a corporation of Delaware
No Drawing. Filed Feb. 10, 1960, Ser. No. 7,775
9 Claims. (Cl. 260—79)

This invention relates to new polymeric products. More particularly, the invention relates to a new class of sulfur-containing polymeric compounds possessing good extreme pressure properties when added to lubricants.

It is an object of the invention to provide new sulfur-containing polymeric products. It is a further object to provide new oleophilic sulfur-containing polymers. It is a further object to provide sulfur-containing polymers which are particularly useful as extreme pressure agents for lubricating compositions. These and other objects of the invention will be apparent from the following detailed description thereof.

It has now been discovered that these and other objects may be accomplished by the novel polymeric products of this invention which products are oil-soluble high molecular weight mercapto-modified polymeric compounds having essentially a long linear hydrocarbon backbone chain and attached thereto in a uniform or random fashion two kinds of essential groups, one an oil-solubilizing hydrocarbyl radical, preferably an alkyl radical having an average of between 8 and 20 carbon atoms (preferably 10–16) bonded directly to the hydrocarbon backbone chain or indirectly thereto through a polar group and the other, which is attached through sulfur to the hydrocarbon backbone chain, represented by the radical —S—$(CH_2)_n$—X, wherein X is a polar radical such as —COOR, —OR or —$NR_2$, where R is a hydrogen or a hydrocarbyl radical, preferably an alkyl radical of from 1 to 10 carbon atoms and $n$ is an interger of from 1 to 4. The number of —S—$(CH_2)_n$—X units or groups in the final polymeric compound can vary from 10 to 1000 or more, preferably from 300 to 800, inclusive.

Oil-soluble mercapto-modified [poly(thioether)] polymers of the above type can be prepared by reacting a mercapto compound, such as mercapto acid, ester, ether, alcohol, amine, or mixtures thereof, with an oil-soluble unsaturated essentially linear hydrocarbon polymer having a plurality of oil-solubilizing alkyl radicals of from 8 to 20 carbon atoms attached directly or indirectly to a linear hydrocarbon backbone chain prepared by reacting a lower polyene hydrocarbon with a polymerizable monomer having an oil-soluble alkyl group.

The mercapto compounds include the mercapto aliphatic carboxylic acids such as mercapto acetic acid, mercapto propionic acid, mercapto butyric acid, or mercapto-alkanols such as 2-mercaptoethanol, 2- and 3-mercaptopropanol, 2-, 3- and 4-mercaptobutanol, or ethers of said mercaptoalcohols such as methyl or ethyl 2-mercaptoethanyl or mercaptoamines such as ether or cercapto esters, e.g., ethyl mercaptoacetate or ethyl mercaptobutylate, ethanthiolamine, butanthiolamine and mixtures thereof.

The unsaturated polymers which are reacted with the above mercapto compounds are long chain oil-soluble polymers prepared by polymerizing a lower (4 to 8 carbon atoms per molecule) polyene hydrocarbon with a monoolefinically polymerizable monomer having a higher hydrocarbon moiety (10- carbon atoms) such as long chain alkyl esters of alpha,beta-unsaturated acids, such as acrylic and methacrylic acids, esters of lower unsaturated alcohols, such as vinyl and allyl alcohols and long chain fatty acids, long-chain N-alkyl unsaturated fatty acid amides, such as N-alkyl acrylamides.

Suitable polyene hydrocarbons for forming the copolymers are, for example, 1,3- and 1,4-pentadiene, isoprene, 1,3-hexadiene, 1,3,5-heptatriene, 1,3-cyclopentadiene, methylcyclopentadiene, 1,3- and 1,4-cyclohexadiene, methylcyclohexadiene, and mixtures thereof.

Representative oil-solubilizing monomer compounds which are used to form the copolymers with the polyene hydrocarbons include alpha-unsaturated long chain hydrocarbons, unsaturated esters, unsaturated amides, etc., such as decene-1, dodecene-1, tridecene-1, tetradecene-1, hexadecene-1, heptadecene-1, octadecene-1, tritriacontene-1, tetratriacontene-1, heptacontene-1, 4-methyl-decene-1, 4,4-dimethyldecene-1, 5,5-dimethylhexene-1, 5,5,7,7-tetramethyl-decene-1, 4,4,6,6-tetramethylheptene-1, etc., vinyl decanoate, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behenate, vinyl 4,5,6-trimethyldodecanoate, vinyl 6,8,9-triethyl tridecanoate, vinyl 12-hydroxystearate, vinyl 9,10-dihydroxystearate, vinyl chlorostearate, vinyl cyanostearate, vinyl acetylstearate, vinyl dodecyl ether, vinyl tridecyl ether, vinyl tetracosyl ether, vinyl hexacosyl ether, allyl stearate, allyldodecylether,N-laurylmethacrylamide, N-stearyl methacrylamide, and N,N-distearyl methacrylamide.

The mol ratio of the polyene hydrocarbons to the oil-solubilizing monomer compound can be varied within relatively wide limits, e.g., from 1/10 to 10/1, preferably from 1/5 to 5/1, respectively. The polymer (prior to treatment with mercapto compound) should have a substantial amount of unsaturation and have a molecular weight of at least 500 and may be up to or over 2½ million, but preferably from about 2,000 to about 800,000 and still more preferred molecular weight range is from 100,000 to 600,000.

Depending on the monomers used the polymers can be prepared thermally or in the presence of a suitable catalyst. Thus, with monomers such as butadiene, or isoprene and long chain alpha-olefins such as alpha-dodecene or alpha-octadecene, the so-called Ziegler catalysts are preferred, such as combinations of aluminum trialkyls and a variable valence metal compound, e.g., titanium tetrachloride. In the formation of other types of oil-soluble polymers, such as copolymers of the polyene (e.g., butadiene or isoprene) with lauryl methacrylate or with vinyl stearate or with N-lauryl methacrylamide, oxygen-yielding catalysts are preferred such as, for example, various organic peroxides, including aliphatic, aromatic, heterocyclic and acyl peroxides, such as diethyl peroxide, tertiary butyl hydroperoxide, dibenzoyl peroxide, dimethylthienyl peroxide, dicyclohexyl peroxide, dilauroyl peroxide and urea peroxide. These are mentioned by way of non-limiting examples of suitable organic peroxides. Other catalysts include sodium bisulfite, diethyl sulfoxide, ammonium persulfate, alkali metal perborates, azo compounds, such as alpha, alpha-azodiisobutyronitrile, etc.

The following Examples I–X are given as representative preparations of the intermediate copolymers for reaction with mercapto compounds to form the desired poly(thioether).

*Example I*

About 0.66 mole of 1-octadecene, 1.33 moles of 1-dodecene and 0.5 mole of isoprene in cyclohexane were reacted in the presence of a Ziegler catalyst $(C_2H_5)_3Al \cdot TiCl_4$ at room temperature for about 24 hours. The catalyst was destroyed by addition of methanol and polymer thereafter purified by benzene washing and precipitating from alcohol and vacuum drying. The polymer had an average molecular weight of 300,000 and an average of 750 double bonds per polymer molecule as shown by bromine number.

Example II

About 0.5 mole of isoprene, 0.17 mole of 1-octadecene and 0.34 mole of 1-dodecene in benzene were reacted in the presence of the Ziegler catalyst and under the conditions of Example I. The polymer formed had a molecular weight between 350,000–400,000 and a bromine number of 120.

Example III

About 2 moles of butadiene and 1 mole of lauryl methacrylate and 1% diterbutyl peroxide were reacted at 75–100° C. for about 24 hours. The polymer was purified by alcohol washing, filtered and dried. The resulting copolymer had a molecular weight of 3000–5000 and substantial unsaturation as shown by a bromine number of 80 to 100.

Following essentially the procedures of Examples I–III, other polymers were prepared in accordance with the following tabulation:

| Example | Catalyst | Temperature | Polyene/oil-soluble monolefins ratio | Mol wt.[1] | Bromine No. |
|---|---|---|---|---|---|
| IV | Ziegler Cat | Room temp | butadiene(2)/octadecene-1(1) | 400,000 | 90 |
| V | do | 60-70° C | cyclopentadiene(1)/isoprene(2)/octadecene-1(1) | 250,000 | 80 |
| VI | Benzoyl peroxide | 80° C | isoprene(3)/lauryl methacrylate(1) | 5,000 | 50 |
| VII | do | 110° C | butadiene(2)/cyclopentadiene(1) vinyl stearate(1) | 5,000 | 40 |
| VIII | Ditert-butyl peroxide | 80° C | pentadiene(3)/N-lauryl-methacrylamide(1) | 3,000 | 45 |
| IX | do | 120° C | isoprene(3)/lauryl methacrylate(1) stearylmethacrylate(1) | 8,000 | 33 |
| X | do | 100° C | isoprene(3)/allyl stearate(1) | 2,000 | 45 |

[1] Ml. wt. determined by light scattering technique described in Chem. Rev., vol. 40, p. 139 (1948).

The final oil-soluble polymeric additive was prepared by reacting the unsaturated copolymers, such as those of Examples I–X, with one or more of the mercapto compounds by suitable means, such as described in Jour. Am. Chem. Soc., 79, 362 (1957), or Jr. Org. Chem., 22, 197 (1957), preferably between room temperature and about 100° C. and in the presence of a free radical catalyst such as an azo or a peroxide catalyst or ultraviolet light and in a non-reactive solvent such as benzene, toluene, xylene or the like. Suitable initiators include peroxides such as tert-butyl peroxide and azo compounds such as alpha,-alpha-azodiisobutyronitrile or emulsion redox systems such as a mixture of sodium bisulfite and persulfate, ammonium persulfate, alkali metal (Na) perborates, etc.

The sulfur content of the resulting polymer is in the range of 1% to 30% and usually is about 6 to 12% by weight.

The following Examples A–J illustrate the preparation of poly(thioether) additives for use in oil compositions in accordance with the present invention.

Example A

The copolymer of Example I was mixed with about 20% excess of mercaptoacetic acid and the mixture was reacted in the presence of tert-butyl hydroperoxide for 2–4 hours at about 40° C. The reaction mixture was diluted with diethyl ether, water washed, filtered and dried. The final average polymer molecule contained over 600 units of —S—CH$_2$COOH groups distributed in the molecule.

Example B

The procedure of Example A was followed using the polymer of Example II and 2-mercaptoethanol as the mercapto compound. The final average polymer molecule contained over 500 units of —S—CH$_2$CH$_2$—OH groups distributed in the molecule.

Example C

The procedure of Example A was followed using the polymer of Example I and methyl 2-mercaptoacetate as the mercapto compound. The final product contained over 500 units of —SCH$_2$COOCH$_3$ groups distributed in the molecule.

Following essentially the above procedures other thia-containing polymers containing a plurality of sulfur-containing groups in the molecule were prepared in accordance with the following tabulation.

| Example | Polymer | Functional Group Introduced | Catalyst | Temperature, °C. | Percent S in Polymer |
|---|---|---|---|---|---|
| D | Ex. IV | —S—CH$_2$COOH | benzoyl peroxide | 40–45 | 6–7 |
| E | Ex. V | —S—CH$_2$CH$_2$NH$_2$ | do | 40–45 | 6–7 |
| F | Ex. VI | —S—CH$_2$CH$_2$COOH | tert-butylperoxide | 50–60 | 5–5.5 |
| G | Ex. VII | —S—CH$_2$COOC$_2$H$_5$ | do | 50–60 | 2 |
| H | Ex. VIII | —SCH$_2$CH$_2$N(C$_2$H$_5$)$_2$ | do | 50–60 | 2 |
| I | Ex. IX | —S—CH$_2$COOH | benzoyl peroxide | 50–60 | 3–4 |
| J | Ex. X | —S—CH$_2$COOH | do | 50–60 | 1 |

The mercapto-modified poly(thioether) polymers in general are oil-soluble and when used as additives in lubricating oils they can be used in amounts of from about 0.5% to about 20%, preferably from about 1% to about 5% by weight.

The lubricating oil base which can be improved by the polymers of this invention can be selected from various synthetic oils or natural hydrocarbon oils having a viscosity range of from 50 SUS at 100° F. to 250 SUS at 210° F. (SAE viscosity number ranging from SAE 5W to SAE 90). The natural hydrocarbon oils are obtainable from paraffinic, naphthenic, asphaltic or mixed base crudes, and/or mixtures thereof. Useful synthetic oils include polymerized olefins, alkylated aromatics, isomerized waxes, copolymers of alkylene glycols and alkylene oxide (Ucon fluid, U.S. 2,425,755, 2,425,845 and 2,774,733) organic polyesters such as esters of an aliphatic dibasic acid and a monohydric alcohol, such as di-2-ethyl hexyl sebacate or di-2-ethyl hexyl adipate esters of polyhydric alcohols and monocarboxylic acids, such as pentaerythritol tetracaproate, and the like. Useful Ucon fluids are Ucon 50HB170, Ucon 50HB660 or Ucon LB550X, which are copolymers of ethylene and 1,2-propylene oxides; the diols as well as their mono- and dialkyl ethers are useful. The hydrocarbon oils may be blended with fixed oils such as castor oil, lard oil and the like and/or synthetic oils as mentioned or silicone polymers and the like.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

The test runs were made in the spur-gear machines on the following compositions: Composition A (1010 mineral oil+2% Example A additive); Composition B (1010 mineral oil+2% Example B additive) and Composition C (SAE 90 mineral oil+3% Example E additive).

The spur-gear machine consists essentially of two geometrically similar pairs of gears connected by two parallel shafts. The gear pairs are placed in separate gear boxes, which also contain the supporting ball bearings. One of the shafts consists of two sections connected by a coupling. Loading is accomplished by locking one side of the coupling and applying torque to the other. The conditions of the test were:

```
Speed _____ 3200
Oil temperature_____ °F__ 100
Oil flow-rate_____ cc./sec__ 10
```
Load in increments 5 min. at each setting.

Compositions A, B, and C carried score loads of from 3,000 to 12,000 lbs./in. On the other hand, 1010 mineral oil containing separately 2% of the polymers of Examples I to X carried score loads of about 700 lbs./in. and neat 1010 mineral oil carried a score load of 600.

The sulfur-containing polymers of this invention are useful also for providing superior load-carrying properties in lubricating oils which contain minor amounts of other agents which are non-reactive with the polymer, such as silicone anti-foaming agents, alkylphenol antioxidants, polyacrylate ester viscosity-index improvers, and the like.

Polymeric thioether containing compounds of this invention can be used to improve other types of compositions such as fuel oils with respect to screen clogging, greases to improve their load carrying properties, hydraulic fluids of the oil, water-in-oil emulsion or synthetic type with respect to wear inhibition and the like.

This application is a continuation-in-part of our application Serial No. 735,960, filed May 19, 1958.

We claim as our invention:

1. An oil-soluble high molecular weight polymer containing a plurality of $C_8$–$C_{20}$ alkyl groups and —S—$(CH_2)_n$X groups attached to different carbon atoms of a linear hydrocarbon chain wherein $n$ is an integer of 1 to 4 and X is a polar group selected from the group consisting of —COOR, —OR and —$NR_2$, and R is selected from the group consisting of hydrogen and $C_1$–$C_{10}$ alkyl radicals said polymer having a sulfur content of from 1% to 30% and a molecular weight of from 2000 to 800,000 obtained by reacting an omega-polar-substituted mercaptan in the presence of a catalyst with a copolymer of a $C_4$–$C_8$ diolefin and a polymerizable oil-soluble monomer containing a $C_8$–$C_{20}$ alkyl radical selected from the group consisting of α-unsaturated monoolefinic hydrocarbons, of $C_{8-20}$ alkyl acrylates, vinyl esters of $C_{8-20}$ fatty acids, vinyl ethers of $C_{8-20}$ alkanols and $C_{8-20}$ alkyl acrylamides.

2. An oil-soluble linear hydrocarbon polymer containing —$C_{8-20}$ alkyl groups, ester groups and —$SCH_2COOH$ groups attached in random fashion to different carbon atoms of the linear hydrocarbon chain, said polymer having a sulfur content of from 1% to 30% and a molecular weight of from 2,000 to 800,000 obtained by reacting $HSCH_2COOH$ in the presence of a peroxide catalyst with a copolymer of a $C_4$–$C_8$ diolefin and a $C_8$–$C_{20}$ alkyl methacrylate.

3. An oil-soluble linear hydrocarbon polymer containing —$C_8$–$C_{20}$ alkyl groups, ester groups and

—$SCH_2CH_2OH$ groups attached in random fashion to different carbon atoms of the linear hydrocarbon chain, said polymer having a sulfur content of from 1% to 30% and a molecular weight of from 2000 to 800,000 obtained by reacting $HSCH_2CH_2OH$ in the presence of a peroxide catalyst with a copolymer of a $C_4$–$C_8$ diolefin and a $C_8$–$C_{20}$ alkyl methacrylate.

4. An oil-soluble linear hydrocarbon polymer containing —$C_8$–$C_{20}$ alkyl groups, ester groups and

—$SCH_2COOCH_3$ groups attached in random fashion to different carbon atoms of the linear hydrocarbon chain, said polymer having a sulfur content of from 1% to 30% and a molecular weight of from 2000 to 800,000 obtained by reacting $HSCH_2COOCH_3$ in the presence of a peroxide catalyst with a copolymer of a $C_4$–$C_8$ diolefin and a $C_8$–$C_{20}$ alkyl methacrylate.

5. An oil-soluble linear hydrocarbon polymer containing —$C_8$–$C_{20}$ alkyl groups, ester groups and

—$SCH_2CH_2NH_2$ groups attached in random fashion to different carbon atoms of the linear hydrocarbon chain, said polymer having a sulfur content of from 1% to 30% and a molecular weight of from 2000 to 800,000 obtained by reacting $HSCH_2CH_2NH_2$ in the presence of a peroxide catalyst with a copolymer of a $C_4$–$C_8$ diolefin and a $C_8$–$C_{20}$ alkyl methacrylate.

6. An oil-soluble linear hydrocarbon polymer containing —$C_8$–$C_{20}$ alkyl groups, ester groups and

—$SCH_2CH_2OH$ groups attached in random fashion to different carbon atoms of the linear hydrocarbon chain, said polymer having a sulfur content of from 1% to 30% and a molecular weight of from 2000 to 800,000 obtained by reacting $HSCH_2CH_2OH$ in the presence of a peroxide catalyst, a copolymer of $C_{4-8}$ diolefin and a $C_{8-20}$ α-monoolefin.

7. An oil-soluble linear hydrocarbon polymer containing a $C_{14-18}$ alkyl group and a —$SCH_2COOH$ group obtained by reacting $HSCH_2COOH$ in the presence of a peroxide catalyst, with a copolymer of 1-octadecene/1-dodecene/isoprene, the polymer having a molecular weight of from 2000 to 800,000.

8. An oil-soluble linear hydrocarbon polymer containing a $C_{14-18}$ alkyl group and a —$SCH_2CH_2OH$ group obtained by reacting $HSCH_2CH_2OH$ in the presence of a peroxide catalyst, with a copolymer of 1-octadecene/1-dodecene/isoprene, the polymer having a molecular weight of from 2000 to 800,000.

9. An oil-soluble linear hydrocarbon polymer containing a $C_{14-18}$ alkyl group and a —$SCH_2COOH$ group obtained by reacting $HSCH_2COOH$ in the presence of a peroxide catalyst, with a copolymer of lauryl methacrylate/stearyl methacrylate/isoprene, the polymer having a molecular weight of from 2000 to 800,000.

References Cited in the file of this patent

UNITED STATES PATENTS 2,581,092    Garber _____ Jan. 1, 1952